United States Patent
Lee

(10) Patent No.: US 11,814,753 B2
(45) Date of Patent: Nov. 14, 2023

(54) METHOD FOR MANUFACTURING ANTIBACTERIAL COPPER NANOFIBER YARN

(71) Applicant: QUANN CHENG INTERNATIONAL CO., LTD., Pingtung (TW)

(72) Inventor: Hsing Hsun Lee, Pingtung (TW)

(73) Assignee: QUANN CHENG INTERNATIONAL CO., LTD., Pingtung (TW)

( * ) Notice: Subject to any disclaimer, the term of this patent is extended or adjusted under 35 U.S.C. 154(b) by 14 days.

(21) Appl. No.: 17/377,842

(22) Filed: Jul. 16, 2021

(65) Prior Publication Data

US 2022/0098763 A1 Mar. 31, 2022

(30) Foreign Application Priority Data

Sep. 29, 2020 (TW) .................................. 109133927

(51) Int. Cl.
*C08J 3/22* (2006.01)
*D01D 1/04* (2006.01)
(Continued)

(52) U.S. Cl.
CPC ............... *D01F 8/18* (2013.01); *C08J 3/226* (2013.01); *D01D 1/02* (2013.01); *D01D 5/06* (2013.01);
(Continued)

(58) Field of Classification Search
CPC .... C08J 3/22; C08J 3/226; D01D 1/04; D01D 5/08; D01D 5/088; D01D 5/12;
(Continued)

(56) References Cited

U.S. PATENT DOCUMENTS 4,076,783 A * 2/1978 Yasuda .................... D01F 6/84
264/210.8
9,878,480 B1 * 1/2018 Grimes ................... D01F 1/103
(Continued)

FOREIGN PATENT DOCUMENTS

CN 1762218 A * 4/2006 ............. A01N 59/16
KR 101406779 B1 * 6/2014 ............. D01F 1/103

OTHER PUBLICATIONS

Translation of CN 1762218 A (published on Apr. 26, 2006).*
Translation of KR 101406779 B1 (published on Jun. 17, 2014).*

*Primary Examiner* — Leo B Tentoni
(74) *Attorney, Agent, or Firm* — Juan Carlos A. Marquez; Marquez IP Law Office, PLLC

(57) ABSTRACT

A method for manufacturing antibacterial copper nanofiber yarn includes steps of: raw material mixing operation and spinning operation, where the raw material mixing operation is to mix dry copper nanopowder having a particle size of no more than 48 nm with fiber slurry; and the spinning operation includes the following steps: mixing and stirring the copper nanopowder and the fiber slurry so that the copper nanopowder is uniformly distributed in the fiber slurry to prepare a mixed material; drying the mixed material; hot-melt drawing the mixed material, i.e. drawing out yarn with the dried mixed material through a drawing machine to form first-stage yarn; stretching and extending, i.e. passing the first-stage yarn through a plurality of rollers to stretch the first-stage yarn; naturally air-cooling the first-stage yarn to form second-stage yarn; and collecting yarn, i.e. collecting the second-stage yarn to fabricate an antibacterial copper nanofiber yarn finished product.

5 Claims, 2 Drawing Sheets

(51) Int. Cl.
- *D01D 5/08* (2006.01)
- *D01D 5/088* (2006.01)
- *D01D 5/12* (2006.01)
- *D01D 5/06* (2006.01)
- *D01F 8/18* (2006.01)
- *D01F 9/08* (2006.01)
- *D01D 1/02* (2006.01)
- *D01D 5/098* (2006.01)
- *D01D 7/00* (2006.01)
- *D02G 3/12* (2006.01)
- *D02J 1/22* (2006.01)
- *D01F 1/10* (2006.01)
- *B82Y 40/00* (2011.01)

(52) U.S. Cl.
CPC .............. *D01D 5/098* (2013.01); *D01D 7/00* (2013.01); *D01F 1/103* (2013.01); *D01F 9/08* (2013.01); *D02G 3/12* (2013.01); *D02J 1/22* (2013.01); *B82Y 40/00* (2013.01); *D10B 2101/20* (2013.01); *D10B 2331/10* (2013.01); *D10B 2401/13* (2013.01)

(58) Field of Classification Search
CPC .. D01D 5/16; D01D 7/00; D01F 1/103; D02J 1/22; D10B 2401/13
USPC .......... 264/210.3, 210.6, 210.8, 211, 211.12, 264/211.14, 234, 349; 523/351
See application file for complete search history.

(56) References Cited

U.S. PATENT DOCUMENTS

| | | | |
|---|---|---|---|
| 2010/0098949 A1* | 4/2010 | Burton | A61L 31/16 428/425.9 |
| 2010/0189756 A1* | 7/2010 | Kusuura | B01D 46/0001 424/409 |
| 2016/0340809 A1* | 11/2016 | Fisher | D01F 1/103 |

* cited by examiner

METHOD FOR MANUFACTURING ANTIBACTERIAL COPPER NANOFIBER YARN

BACKGROUND

Technical Field

The present invention relates to a method for manufacturing antibacterial fiber yarn, and in particular to a method for manufacturing antibacterial copper nanofiber yarn by mixing nanoscale copper powder with polymer slurry and then spinning the mixture.

Related Art

Common man-made fiber products are usually used for people or pets to wear, including knitted fabrics, clothing, scarves, masks, gloves and other products. However, these fiber products being in the closest contact with people or pets are also the most likely to be contaminated by bacteria and breed pathogens, which is harmful to the users. Therefore, fiber products with antibacterial effects are in demand.

Generally, the so-called "antibacterial" mainly refers to controlling the parasitism and increase of microorganisms, inhibiting the reproduction of bacteria which are harmful to the human body and preventing the reproduction of bacteria in advance. Fibers and textiles are likely to absorb sweat and human body fluids or skin excreta, and such excreta are the best breeding place for bacteria. Most of bacteria use the excreta as nourishment to grow and reproduce, and also decompose to generate many unpleasant smells and gases.

According to a new study published by the World Health Organization at the First International Conference on Prevention and Infection Control in Switzerland, the use of antibacterial copper surfaces in hospitals can reduce the chance of Healthcare-Associated infection (HAI) by up to 40%, and can effectively kill 97% of bacteria and many viruses and fungal pathogens.

Copper is a life element contained in the human body, so the compounds of copper ions can be dissolved. Copper entering a human body is also normally metabolized and excreted from the human body, so copper does not irritate or cause allergies to human skin and is safe for human health.

In 2009, Professor Bill Keevil from the University of Southampton in the United Kingdom published a research report, pointing out that copper can inhibit the A H1N1 influenza virus. After 6 hours, there was almost no surviving influenza virus on the copper surface, while after 24 hours, there were still 500,000 viruses alive on the stainless steel surface. In the same year, a test conducted by the US Environmental Protection Agency (EPA) showed that at room temperature, copper alloys can kill 99.9% of the superbug MRSA on their surface within two hours.

As a functional fiber and a new antibacterial textile, copper ion antibacterial fiber can block the spread of diseases, eliminate odors and revitalize the skin. As early as 2008, the Natural Resources Defense Council (NRDC), a US-based environmental protection agency, registered and approved five types of copper alloys for antibacterial materials. These copper alloys can kill 99% of bacteria on the surface of objects within 2 hours.

SUMMARY

An objective of the present invention is to provide a method for manufacturing antibacterial copper nanofiber yarn, by uniformly mixing nano-sized copper particles with polymer fiber slurry and spinning and drawing the mixture to fabricate an antibacterial copper nanofiber yarn finished product such as masks, clothing, etc.

To achieve the above objective, the present invention provides a method for manufacturing antibacterial copper nanofiber yarn, including the following steps: raw material mixing operation: mixing dry copper nanopowder with fiber slurry; and spinning operation, including the following steps: mixing and stirring the copper nanopowder and the fiber slurry so that the copper nanopowder is uniformly distributed in the fiber slurry to form a mixed material; drying the mixed material to remove excessive moisture; hot-melt drawing the mixed material, i.e. drawing out yarn with the dried mixed material through a drawing machine to form first-stage yarn; stretching and extending, i.e. passing the first-stage yarn through a plurality of rollers to stretch the first-stage yarn; naturally air-cooling the first-stage yarn to shape the first-stage yarn to form second-stage yarn; and collecting yarn, i.e. collecting the second-stage yarn to fabricate an antibacterial copper nanofiber yarn finished product.

To achieve the above objective, the present invention provides another method for manufacturing antibacterial copper nanofiber yarn, including the following steps: raw material mixing operation: mixing dry copper nanopowder with fiber slurry to form a mixed raw material; mixing and granulating operation: heating, blending, extruding and granulating the mixed raw material through a mixer, and then melting to form a plurality of antibacterial copper nano-masterbatches; and spinning operation, including the following steps: mixing and stirring the antibacterial copper nano-masterbatches and a plurality of thermoplastic polyurethane colloidal particles to form a mixed material; drying the mixed material to remove excessive moisture; hot-melt drawing the mixed material, i.e. drawing out yarn with the dried mixed material through a drawing machine, and at a yarn drawing port, simultaneously allowing the thermoplastic polyurethane colloidal particles to wrap around the outer side of the yarn after hot-melt to form the whole into first-stage yarn; water-cooling the first-stage yarn with a cooling tank to shape the first-stage yarn; stretching and extending, i.e. passing the first-stage yarn through a plurality of rollers to stretch the first-stage yarn; naturally air-cooling the first-stage yarn to reduce deformation of the surface of the first-stage yarn and to shape the interior of the first-stage yarn, so that the first-stage yarn forms second-stage yarn; and collecting yarn, i.e. collecting the second-stage yarn to fabricate an antibacterial copper nanofiber yarn finished product.

In some implementation aspects, the copper nanopowder is mixed with the fiber slurry in a weight percentage range of 0.1%-30%, and further, the preferred range is 20%-24%.

In some implementation aspects, the fiber slurry includes thermoplastic polyurethane (TPU), thermoplastic rubber (TPR), polyethylene (PE), polypropylene (PP), polyethylene terephthalate (PET), polyamide (PA), polybutylene terephthalate (PBT), ethylene-vinyl acetate copolymer (EVA) or nylon.

In some implementation aspects, after the step of collecting yarn, i.e. collecting the second-stage yarn, the second-stage yarn is further dried to reduce the humidity in the second-stage yarn.

In some implementation aspects, the drying time of the second-stage yarn is 48 hours.

In some implementation aspects, in the step of yarn collecting, the second-stage yarn is furled on a wheel or in a container by means of winding.

In some implementation aspects, in the step of mixing and stirring the antibacterial copper nano-masterbatches and the plurality of thermoplastic polyurethane colloidal particles, a colorant can be simultaneously added to color the plurality of thermoplastic polyurethane colloidal particles.

The present invention is characterized in that by mixing the copper powder having an averaged particle size of no more than 48 nm with the fiber slurry, the adhesion of copper ions can be improved in the subsequently fabricated fiber yarn, thereby improving the antibacterial sustainability of the fiber yarn. In the present invention, the nanoscale copper powder is mixed with the fiber so that the fiber material itself evenly carries the antibacterial copper nanomaterial. Different from a traditional process of soaking the surface of the fiber with an antibacterial agent, the present invention has a long-acting function of inhibiting the reproduction and growth of bacteria. The present invention can use molten thermoplastic polyurethane colloidal particles to form a viscous surface layer to wrap around the outer side of the yarn while drawing, thereby increasing flexibility in application.

DETAILED DESCRIPTION

Figure 1:
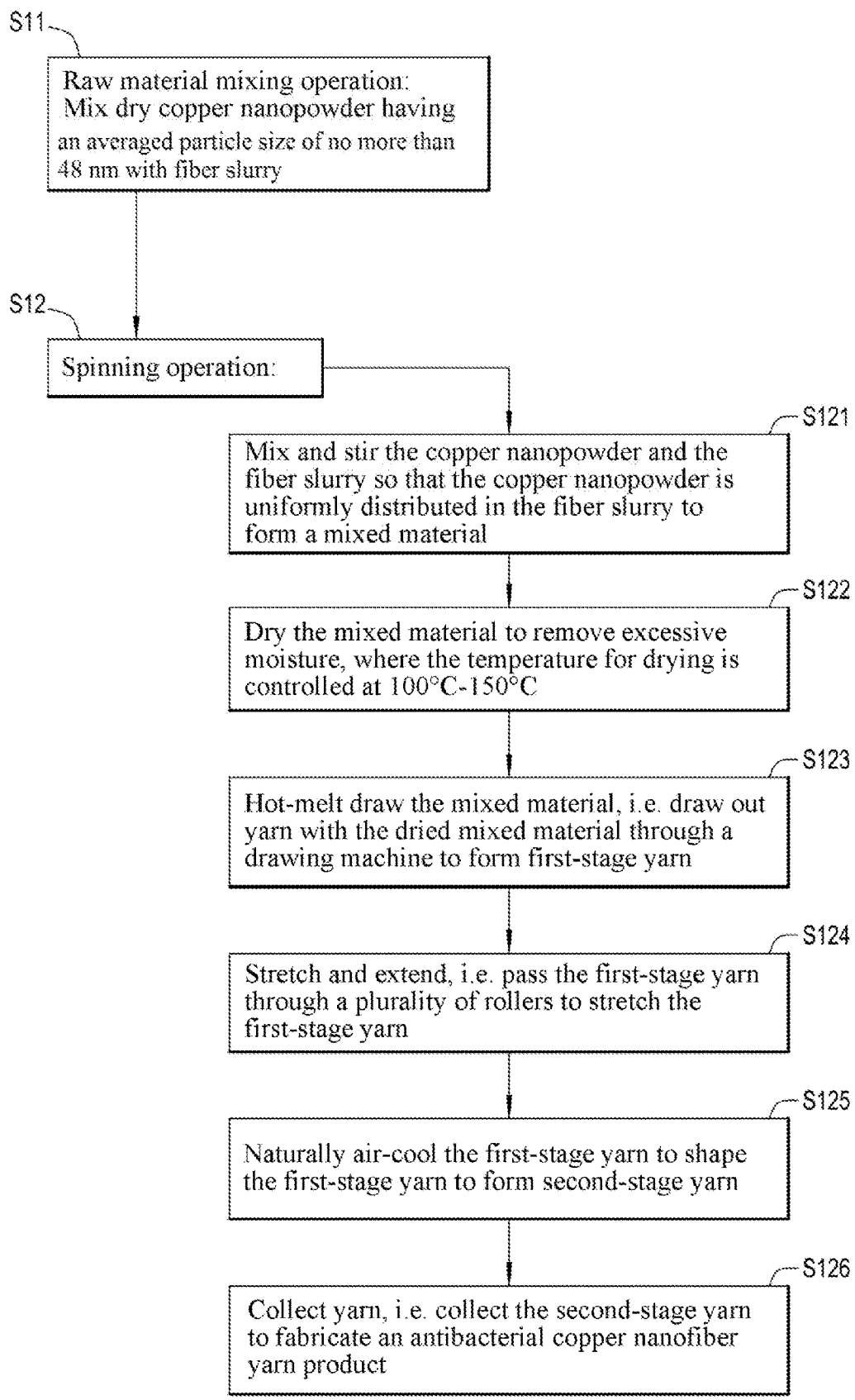
FIG. 1 is a method for manufacturing antibacterial copper nanofiber yarn according to a first embodiment of the present invention.

Embodiments of the present invention are described in detail below with reference to the accompanying drawings, the accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the specification of size of the components is actually an optional design, and the layout of the components may be more complicated.

In addition, the drawings may not be necessarily drawn to scale. For example, sizes of some components in the drawings may be increased or reduced, to illustrate improvements on understanding of various implementations. Similarly, to discuss some of the implementations, some components and/or operations may be divided into different blocks or combined into a single block. In addition, although specific embodiments are exemplarily shown in the drawings and described below in detail, any modification, equivalent, or replacement that can be figured out by a person skilled in the art shall fall within the scope of the appended claims.

Refer to an embodiment of the present invention as shown in FIG. 1. The steps of a method for manufacturing antibacterial copper nanofiber yarn of the present embodiment include: raw material mixing operation (step S11) and spinning operation (step S12):

where the raw material mixing operation (step S11) is to mix dry copper nanopowder having an averaged particle size of no more than 48 nm with fiber slurry; and the spinning operation (step S12) includes the following steps:

mixing and stirring the copper nanopowder and the fiber slurry so that the copper nanopowder is uniformly distributed in the fiber slurry to form a mixed material (step S121);

drying the mixed material to remove excessive moisture, where the temperature for drying is controlled at 100° C.-150° C. (step S122);

hot-melt drawing the mixed material, i.e. drawing out yarn with the dried mixed material through a drawing machine to form first-stage yarn (step S123);

stretching and extending, i.e. passing the first-stage yarn through a plurality of rollers to stretch the first-stage yarn (step S124);

naturally air-cooling the first-stage yarn to shape the first-stage yarn to form second-stage yarn (step S125); and collecting yarn, i.e. collecting the second-stage yarn to fabricate an antibacterial copper nanofiber yarn finished product (step S126).

Figure 2:
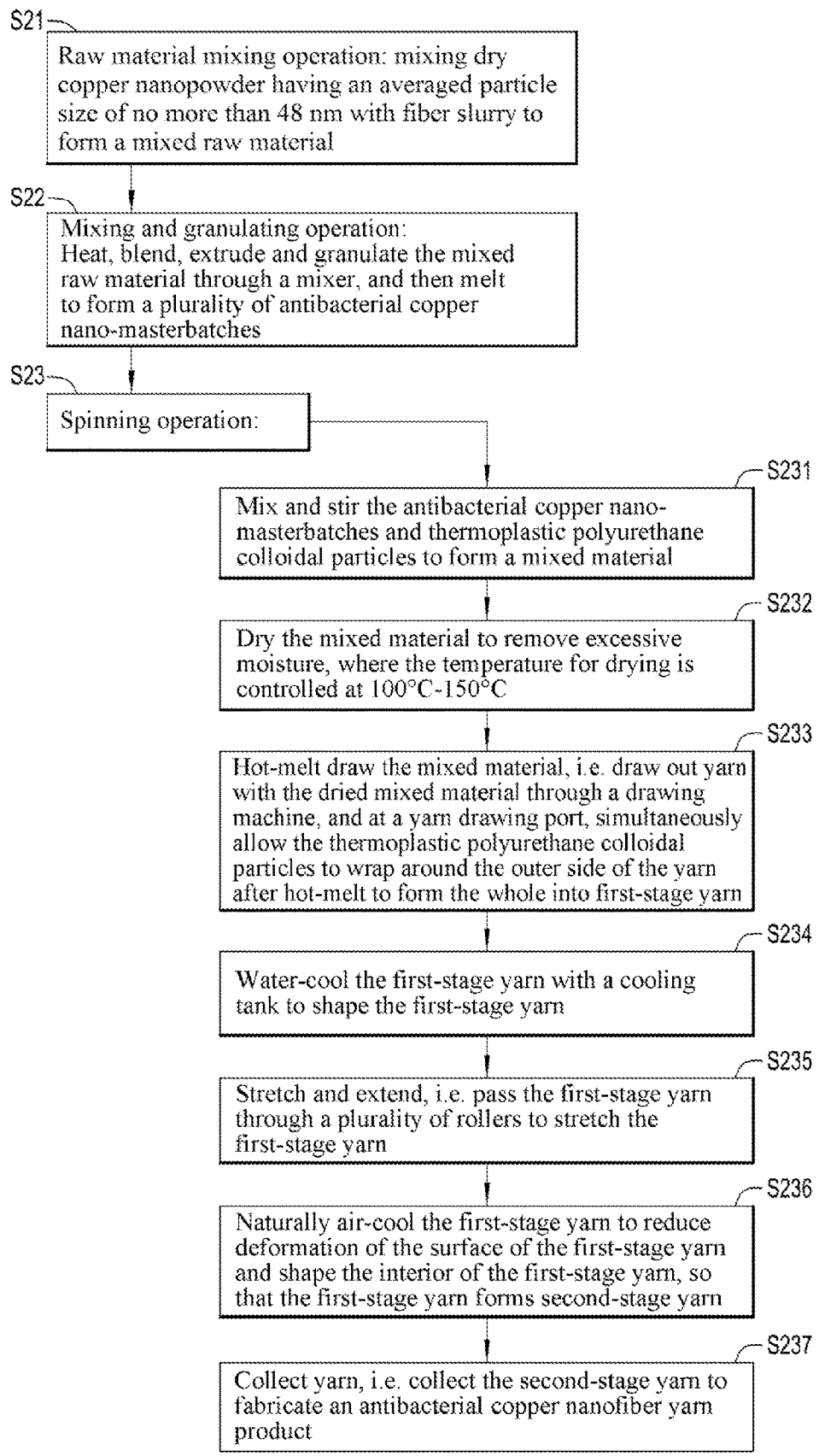
FIG. 2 is a method for manufacturing antibacterial copper nanofiber yarn according to a second embodiment of the present invention.

Refer to another embodiment of the present invention as shown in FIG. 2. The steps of a method for manufacturing antibacterial copper nanofiber yarn of the present embodiment include:

raw material mixing operation: mixing dry copper nanopowder having an averaged particle size of no more than 48 nm with fiber slurry to form a mixed raw material (step S21);

mixing and granulating operation: heating, blending, extruding and granulating the mixed raw material through a mixer, and then melting to form a plurality of antibacterial copper nano-masterbatches (step S22); in practice, mixing and granulating in the step can be performed through a twin-screw mixer by controlling proper residence time and temperature; and spinning operation (step S23), including the following steps:

mixing and stirring the antibacterial copper nano-masterbatches and a plurality of thermoplastic polyurethane colloidal particles to form a mixed material (step S231);

drying the mixed material to remove excessive moisture, where the temperature for drying is controlled at 100° C.-150° C. (step S232);

hot-melt drawing the mixed material, i.e. drawing out yarn with the dried mixed material through a drawing machine, and at a yarn drawing port, simultaneously allowing the thermoplastic polyurethane colloidal particles to wrap around the outer side of the yarn after hot-melt to form the whole into first-stage yarn (step S233);

water-cooling the first-stage yarn with a cooling tank to shape the first-stage yarn (step S234);

stretching and extending, i.e. passing the first-stage yarn through a plurality of rollers to stretch the first-stage yarn (step S235);

naturally air-cooling the first-stage yarn to reduce deformation of the surface of the first-stage yarn and shape the interior of the first-stage yarn, so that the first-stage yarn forms second-stage yarn (step S236); and collecting yarn, i.e. collecting the second-stage yarn to fabricate an antibacterial copper nanofiber yarn finished product (step S237).

In an embodiment, in the aforementioned step of yarn collecting (step S126 or step S237), the second-stage yarn is furled on a wheel or in a container by means of winding.

Of course, after the aforementioned step of collecting yarn, i.e. step S126 or step S237 (a step of collecting the second-stage yarn), the second-stage yarn can be further dried to reduce the humidity in the second-stage yarn. The drying time of the second-stage yarn is 48 hours.

In the above two embodiments, the raw materials of the fiber slurry include thermoplastic polyurethane (TPU), thermoplastic rubber (TPR), polyethylene (PE), polypropylene (PP), polyethylene terephthalate (PET), polyamide (PA), polybutylene terephthalate (PBT), ethylene-vinyl acetate copolymer (EVA) or nylon. During spinning into yarn, single yarn, twisted yarn, combined yarn, and combined twisted yarn can be adopted. In addition, a single component can be adopted, or yarn made of two or more types of fiber slurry raw materials can be mixed, to form the antibacterial copper nanofiber.

In the above step S231 or step S121, a colorant in a suitable proportion and formula can be further added to color the thermoplastic polyurethane colloidal particles or fiber slurry.

What is claimed is:

1. A method for manufacturing antibacterial copper nanofiber yarn, comprising the following steps:
   raw material mixing operation: mixing dry copper nanopowder having an averaged particle size of no more than 48 nm with fiber slurry to form a mixed raw material;
   mixing and granulating operation: heating, blending, extruding and granulating the mixed raw material through a mixer, and then melting to form a plurality of antibacterial copper nano-masterbatches; and
   spinning operation, comprising the following steps:
   mixing and stirring the antibacterial copper nano-masterbatches and a plurality of thermoplastic polyurethane colloidal particles to form a mixed material;
   drying the mixed material to remove excessive moisture, wherein the temperature for drying is controlled at 100° C-150° C.;
   drawing out yarn with the dried mixed material through a drawing machine, and at a yarn drawing port, simultaneously allowing the thermoplastic polyurethane colloidal particles to wrap around the outer side of the yarn after hot-melt to form the whole into first-stage yarn;
   water-cooling the first-stage yarn with a cooling tank to shape the first-stage yarn;
   passing the first-stage yarn through a plurality of rollers to stretch the first-stage yarn;
   naturally air-cooling the first-stage yarn to reduce deformation of the surface of the first-stage yarn and shape the interior of the first-stage yarn, so that the first-stage yarn forms second-stage yarn; and
   collecting the second-stage yarn to fabricate an antibacterial copper nanofiber yarn finished product, wherein the copper nanopowder added to the fiber slurry is in a weight percentage range of 20%-24%.

2. The method for manufacturing antibacterial copper nanofiber yarn of claim 1, wherein the fiber slurry comprises thermoplastic polyurethane (TPU), thermoplastic rubber (TPR), polyethylene (PE), polypropylene (PP), polyethylene terephthalate (PET), polyamide (PA), polybutylene terephthalate (PBT), ethylene-vinyl acetate copolymer (EVA) or nylon.

3. The method for manufacturing antibacterial copper nanofiber yarn of claim 1, wherein after the step of collecting the second-stageyarn, the second-stage yarn is further dried to have the humidity in the second-stage yarn reduced.

4. The method for manufacturing antibacterial copper nanofiber yarn of claim 3, wherein the drying time of the second-stage yarn is 48 hours.

5. The method for manufacturing antibacterial copper nanofiber yarn of claim 1, wherein in the step of mixing and stirring the antibacterial copper nano-masterbatches and the plurality of thermoplastic polyurethane colloidal particles, a colorant is simultaneously added to color the plurality of thermoplastic polyurethane colloidal particles.

* * * * *